A. M. WHITE.
CATTLE GUARD.
APPLICATION FILED NOV. 21, 1908.

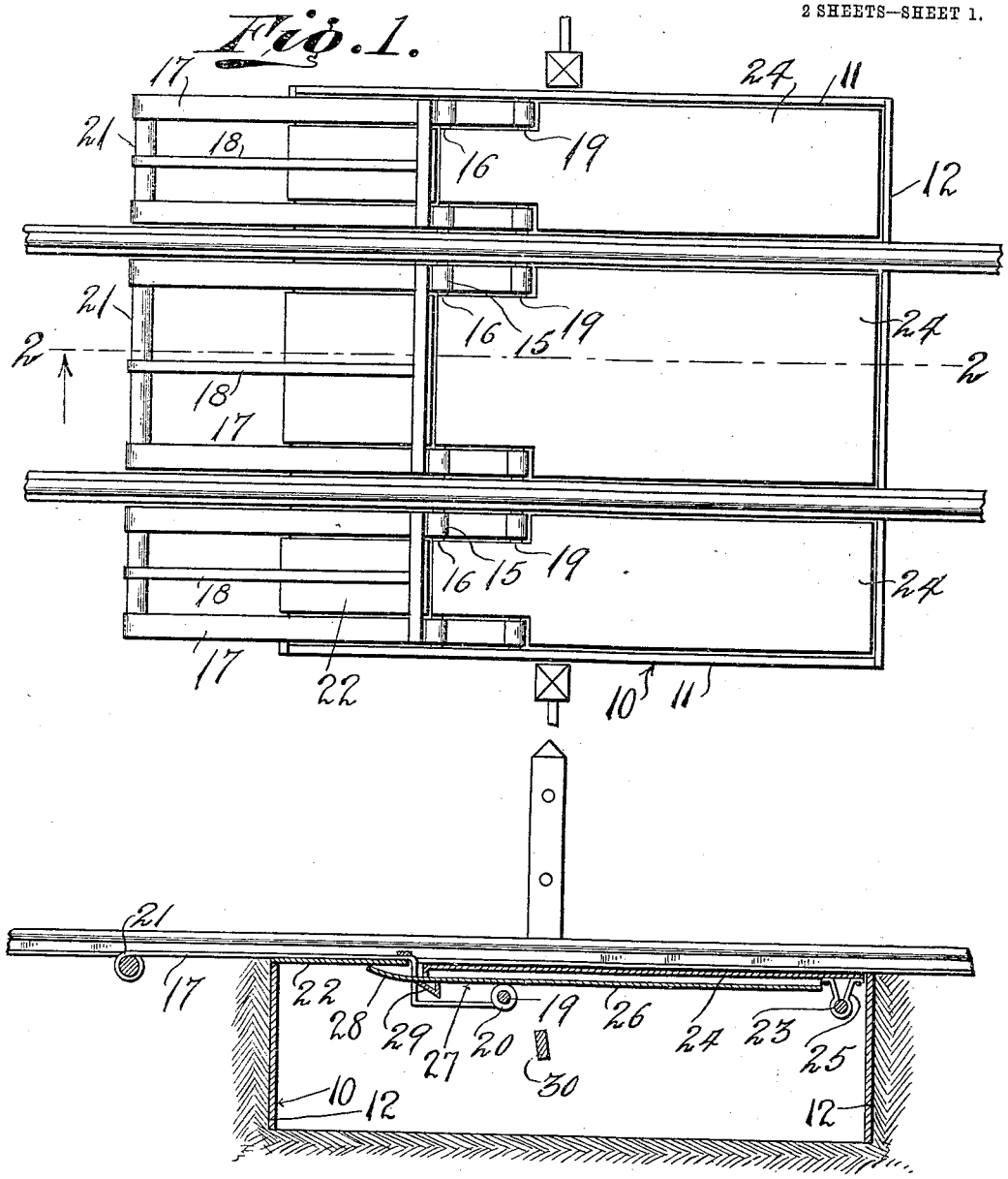

946,478.

Patented Jan. 11, 1910.
2 SHEETS—SHEET 2.

Witnesses
Jos Gregory
M Gillis

Inventor
Arthur M White.
By Chandlee & Chandlee
Attorneys

UNITED STATES PATENT OFFICE.

ARTHUR M. WHITE, OF GREENWOOD, WISCONSIN, ASSIGNOR OF ONE-HALF TO GEORGE N. LOUGHEAD, OF GREENWOOD, WISCONSIN.

CATTLE-GUARD.

946,478.     Specification of Letters Patent.     Patented Jan. 11, 1910.

Application filed November 21, 1908. Serial No. 463,872.

*To all whom it may concern:*

Be it known that I, ARTHUR M. WHITE, a citizen of the United States, residing at Greenwood, in the county of Clark, State of Wisconsin, have invented certain new and useful Improvements in Cattle-Guards; and I do hereby declare the following to be a full, clear, and exact description of the invention, such as will enable others skilled in the art to which it appertains to make and use the same.

The invention relates to cattle guards of the class designed to prevent cattle from entering the right of way of a railroad from a public road.

One object of the invention is to provide an improved general construction of cattle guards of this character in which the operating parts will be protected from the influences of the weather and thus obviating freezing up in cold and snowy weather.

Another object of the invention is to improve the general construction of a cattle guard of this character and render the same simple and effective in operation.

A third object of the invention is to provide a cattle guard of this character which will permit and encourage the passage of any cattle which may stray upon the main line through a broken fence and endeavor to leave the same to pass out upon the public road.

With the above and other objects in view, the invention consists, in general, of a tilting platform, a tilting fence, and mechanism for actuating the same.

The invention further consists in certain novel details of construction and combinations of parts hereinafter fully described, illustrated in the accompanying drawings, and specifically pointed out in the claims.

Figure 3:
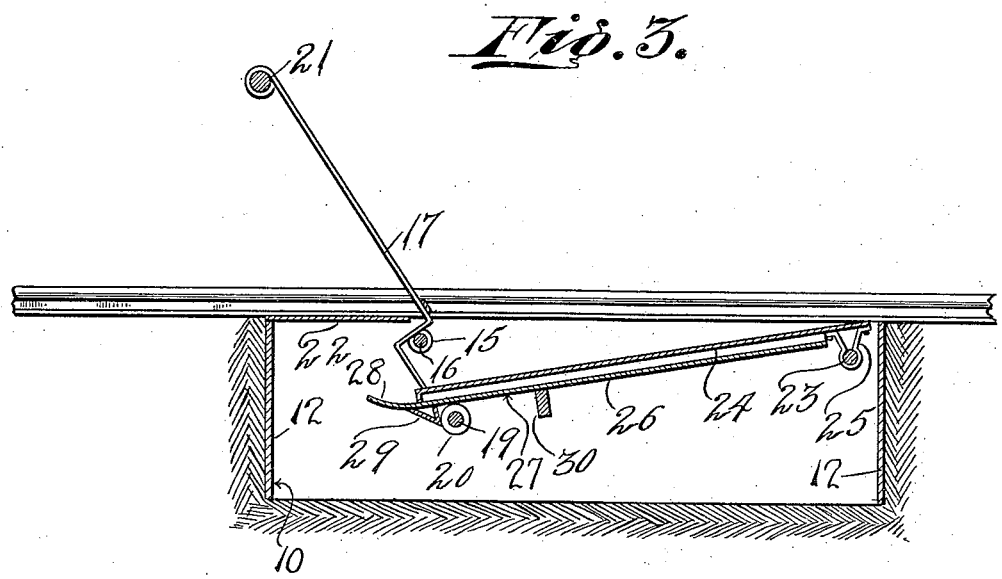
Figure 4:
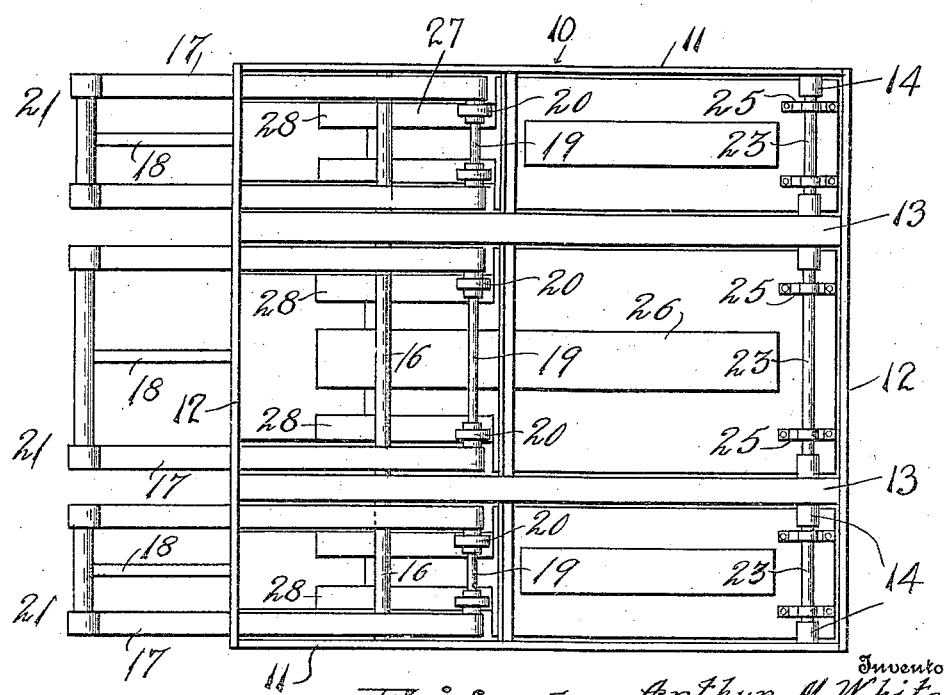

In the accompanying drawings, like characters of reference indicate like parts in the several views, and:—Figure 1 is a top plan view of a cattle guard constructed in accordance with my invention. Fig. 2 is a section on the line 2—2 of Fig. 1 showing the guard fence in depressed position and the platform in raised position. Fig. 3 is a similar view showing the guard fence raised and the platform depressed as is the case when cattle endeavor to pass thereover. Fig. 4 is a bottom plan view of this invention.

The numeral 10 indicates the casing of this invention and this casing is preferably divided into side portions 11 and a central portion 12 by means of partitions 13. Each of the side and central portions is provided at the end adjacent the public road with a pair of ears 14. At the opposite end of each of these partitions there is provided a pair of ears 15. The last mentioned pair of ears are spaced at some little distance from the adjacent end and serve to support a bar 16 whereon is mounted a gate frame 17 provided with a heavy central bar 18 for purposes hereinafter to be described. This gate frame is pivoted intermediate its ends and at its inner end is provided with a cross bar 19 whereon is mounted a pair of rollers 20. The opposite end of this gate frame is weighted as at 21 so that it normally lies in the position shown in Fig. 2. Between the extreme end of the casing and the bar 16 is a platform 22 supported on the sides and on the end of the casing. The ears 14 serve to support a bar 23 which is connected to a platform 24 by means of standards 25. This platform is provided with a central brace member 26 U-shaped in cross section and the end of the platform opposite the bar 23 is provided with track sections as indicated at 27. The lower parts of the track ends form curved extensions 28 and adjacent the extensions 28 and the tracks 27 are triangular stops 29. It is to be observed that these extensions 28 strike against the under sides of the platform extension 22 thus acting as stops to limit the upward movement of the swinging platform 24. This platform is so arranged that the bottoms of the tracks 27 rest on the rollers 20. Suitably positioned between the side walls of the casing are stops 30 which limit the downward movement of the free end of the platform 24. It will thus be seen that there are three of these platforms and three gate sections and that these are positioned with the central platform between the rails and the outside platforms outside of the rails so that no matter in what direction the cattle attempt to pass over the device they are obliged to step upon some one of the platforms 24.

In the operation of the device let it be supposed that cattle are attempting to pass from the main road to the right of way. As soon as one of the cattle steps upon one of the platforms 24 the free end of the platform will be depressed and the gate actuated thereby will be raised. If the gate be raised to such position as to jam the same upright the next locomotive will depress the same by striking the center bar 18. If cattle get on the right of way through a broken fence or the like they can readily pass over the gate and cross the stationary platform 22. If, then, they pass upon the movable platform the gate rises behind them and hustles them quickly out on the public road.

It is to be observed that all of the operating parts are held protected from the weather by the platforms 22 and 24 and that the device is thus protected from freezing up in cold and snowy weather. It is further to be noted that by reason of the construction of the platform 24 being loosely mounted in the ears 14 the same may be readily removed for cleaning the pit formed by the casing.

Having thus described the invention, what I claim as new, is:—

1. In a cattle guard, a casing, rail supporting division members extending longitudinally of said casing, pairs of U-shaped ears held adjacent one end of said casing, one pair of said ears being disposed in each of the divisions of the casing, a bar supported in each pair of ears, a platform fixed to each of said bars, a gate pivotally mounted near the other end of the casing in each of said divisions, each of the gates being provided with a frame having rollers upon its inner end adapted to extend beneath and support the free ends of the respective hinged platforms, stops on the platforms to limit the movement of the respective rollers, other stops fixed in said casing to limit the downward movement of the free ends of the platforms, and a second series of platforms each held in one of said divisions between the free end of its respective first platform and the end of the casing.

2. In a cattle guard, a casing, rail supporting division members extending longitudinally of said casing, pairs of U-shaped ears held adjacent one end of said casing, one pair of said ears being disposed in each of the divisions of the casing, a bar supported in each pair of ears, a platform fixed to each of said bars, a gate pivotally mounted near the other end of the casing in each of said divisions, each of the gates being provided with a frame having rollers upon its inner end adapted to extend beneath and support the free ends of the respective hinged platforms, stops on the platforms to limit the movement of the respective rollers, other stops fixed in said casing to limit the downward movement of the free ends of the platforms, and a second series of platforms each held in one of said divisions between the free end of its respective first platform and the end of the casing, all of said platforms being arranged normally to form a substantially smooth unbroken surface.

In testimony whereof, I affix my signature, in presence of two witnesses.

ARTHUR M. WHITE.

Witnesses:
E. F. WOLLENBERG,
F. L. NORRIS.